United States Patent Office 2,831,868
Patented Apr. 22, 1958

2,831,868

PREPARATION OF 2,4,4-TRIMETHYLCHROMAN-2-OL 2,4,4-TRIMETHYLCHROMEN

William Webster, Falkirk, and Donald Peter Young, Sanderstead, England, assignors, by mesne assignments, to Hercules Powder Company, a corporation of Delaware No Drawing. Application June 10, 1955
Serial No. 514,685

7 Claims. (Cl. 260—345.2)

The present invention refers to a novel process for the production of chromane derivatives and relates in particular to the decomposition of 1:1:3-trimethylindane-3-hydroperoxide by means of an acid decomposition catalyst, to produce 2:4:4-trimethyl chroman-2-ol and its dehydration product, 2:4:4-trimethylchromen-2.

The 1:1:3-trimethylindane-3-hydroperoxide, which is used as starting material for the process of the invention, may be readily produced by the oxidation of 1:1:3-trimethylindane in the liquid phase with molecular oxygen at elevated temperatures. The oxidation may be carried out by passing molecular oxygen or oxygen-containing gases such as air through the hydrocarbon starting material in the dry state or in a dispersion or emulsion thereof in water. In both cases temperatures up to 130° C. may be used, pressure being applied when necessary to preserve the reaction medium in the liquid state. Generally speaking a temperature of about 90° C. was found to be suitable. The oxidation proceeds rapidly at these temperatures and is advantageously carried out in the presence in the liquid reaction mixture of small amounts of alkaline reacting substances such as the hydroxides of alkali or alkaline earth metals, or their salts with weak acids of inorganic or organic nature, such as the carbonates or acetates.

The 1:1:3-trimethylindane-3-hydroperoxide may be recovered and isolated from the reaction mixture by treating the oxidation reaction mixture with aqueous sodium hydroxide solution of fairly high concentration, for instance 25%, whereupon the sodium salt of the hydroperoxide crystallises out. From the sodium salt the free hydroperoxide may be obtained by addition of water, or by neutralising or acidifying, for instance with carbon dioxide. Since 1:1:3-trimethylindane is obtained as a by-product in the reaction of propylene with benzene or isopropylbenzene in the presence of aluminium chloride catalyst to produce mono- or diisopropylbenzene respectively, which compounds are used on a large scale as starting materials to produce the corresponding phenols, the 1:1:3-trimethylindane has become easily accessible and thus forms an inexpensive starting material for the ultimate production of the chromane derivatives according to the process of the present invention.

It has been found that when the 1:1:3-trimethylindane-3-hydroperoxide is subjected to a treatment with an acidic decomposition catalyst two different products result from the reaction. These products are chromane derivatives and have the formulae:

2:2:4-trimethylchroman-2-ol

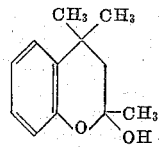

and 2:4:4-trimethylchromen

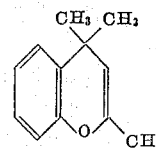

As a by-product bis-2:4:4-trimethylchroman-2-yl ether

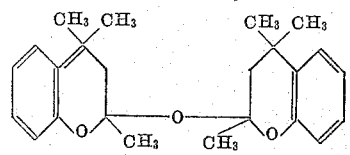

may also be formed. The production of these compounds in this way is unexpected since Hock, Depke, and Knauel have shown in Ber. 83, p. 238 (1950) that 1-methyltetraline hydroperoxide, which in some respects has a similar structure to that of the trimethylindane hydroperoxide, furnishes a keto phenol on reaction with an acidic catalyst.

Suitable catalysts for decomposing 1:1:3-trimethylindane-3-hydroperoxide are the acidic condensation catalysts which are known to effect the decomposition of hydroperoxides of aromatic compounds to produce phenols and ketones or aldehydes. The decomposition may be carried out under anhydrous conditions, by which it is intended to signify that the reaction medium contains not more than 5% by weight of water. Under these conditions suitable acidic condensation catalysts are, for instance, concentrated mineral acids, such as sulphuric acid and phosphoric acid; organic acids such as paratoluenesulphonic acid or chlorinated derivatives of acetic acid; Friedel-Crafts catalysts, such as the chlorides of aluminium, tin, iron, zinc and magnesium; acid treated earths, such as fuller's earth, bentonite or diatomaceous earth; further, silica gel or acid treated hydrogen-ion exchange materials.

The decomposition may also be carried out in an aqueous medium, when the catalyst used may be sulphuric acid in a concentration from about 5 to 95% by weight.

The decomposition may be carried out with the previously isolated hydroperoxide which is preferably dissolved in an inert solvent such as acetone or, as an alternative, the solution of the hydroperoxide resulting from the oxidation reaction and containing the hydroperoxide dissolved in unreacted trimethylindane may be subjected to the decomposition reaction, preferably using acetone as an addition solvent.

The decomposition reaction may be effected within a very wide range of temperature. While it proceeds slowly at ordinary temperature or below, the hydroperoxide decomposes readily at elevated temperatures, and it is preferred to carry out the decomposition when a solvent, such as acetone, is used at the boiling point of the solvent under reflux whereby the heat liberated by the reaction is dissipated.

The relative proportions of the two chromane derivatives which are obtained depend on the conditions under which the decomposition is effected. Thus, when for instance the 1:1:3-trimethylindane hydroperoxide is treated with about 0.5% weight/volume, based on the total reaction mixture, of sulphuric acid, dissolved in acetone at refluxing temperature a product is obtained which contains a major proportion of the chromanol and a minor proportion of the chromen compound. This latter may have been formed from the chromanol by the splitting off of water during the decomposition reaction.

The chromane derivatives resulting from the decomposition may be recovered from the decomposition mixture by suitably neutralising the acidic condensation catalyst, for instance by adding magnesium oxide, and then removing for instance by fractional distillation any organic solvent present. On cooling the solvent-free mixture the 2:4:4-trimethylchroman-2-ol crystallises out. The crystallisation may be promoted by the addition to the mixture of some petroleum ether. The crystals are then filtered off and may be washed with a further amount of petroleum ether. The liquid filtrate from the crystals is then fractionally distilled and furnishes the chromen compound in a pure form.

By subjecting the decomposition reaction mixture if desired after previous neutralisation of the acidic catalyst to fractional distillation in the presence in the reaction mixture of a dehydrating agent such as oxalic acid concentrated sulphuric acid or phosphoric acid, 2:4:4-trimethylchromen is recovered as the sole reaction product.

The 2:4:4-trimethylchroman-2-ol is a white crystalline solid, melting point 94° C. which can readily be etherified and forms a useful intermediate for the production of fungicides, insecticides and other chemical compounds of value, whilst the 2:4:4-trimethylchromen which is a liquid boiling between 97° and 98° C. at 13 mm. $n_D^{20}$ 1.5323, on account of its reactive double bond, also forms an intermediate for the formation of other useful chemicals.

The following examples serve to illustrate the process of the present invention. The parts by weight have the same relationship to parts by volume as kilograms to litres.

Example 1

100 parts by weight of 1:1:3-trimethylindane of 96% molar purity and containing a small amount of orthodiisopropylbenzene as impurity was oxidised at 90° C. in the presence of 25 parts by volume of a 2.4% weight/volume aqueous sodium carbonate solution. The oxidation was carried out with commercial oxygen. Although no initiator was used, no appreciable induction period was observed and in the first 30 minutes 320 parts by volume of oxygen at normal temperature and pressure was absorbed. Thereafter the rate of oxygen absorption increased and was at a maximum between 1½ and 3 hours when 1,950 parts by volume of oxygen per hour were absorbed. The rate of hydroperoxide formation was similarly at a maximum during the stated period and amounted to 14.4% weight/weight trimethylindane hydroperoxide per hour. After 3 hours the rates of oxygen absorption and hydroperoxide formation gradually decreased and the experiment was terminated after 5 hours, when a total of 7,380 parts by volume (N. T. P.) of oxygen had been absorbed to give a product containing 53.1% weight/weight of 1:1:3-trimethylindane-3-hydroperoxide. This corresponds to a hydroperoxide efficiency based on oxygen of 92.4% of theory.

By mixing a concentrated aqueous solution of sodium hydroxide with the reaction mixture the sodium salt of the hydroperoxide was obtained in crystalline form from which the free hydroperoxide was recovered by treatment with carbon dioxide.

The 1:1:3-trimethylindane-3-hydroperoxide thus obtained is insoluble in water but very soluble in most of the usual organic solvents.

30 parts by weight of the isolated hydroperoxide, which had a purity of 84.5%, were dissolved in 50 parts by volume of acetone and added gradually over a period of 13 minutes to a solution of 1 part by volume of concentrated sulphuric acid in 250 parts by volume of acetone under reflux. The reaction was quite vigorous. The mixture was refluxed for a further 10 minutes after which only a trace of hydroperoxide was left in the mixture. The mixture was cooled and stirred with excess solid magnesia until a pH of 6.5 was obtained on diluting a test portion with water. The solution was filtered and the acetone distilled off under reduced pressure. The residue was taken up in benzene, washed with water and the benzene then evaporated under reduced pressure. The residue was obtained as a light yellow oil which partially crystallised on cooling. It was dissolved in petroleum ether (boiling between 60 and 80° C.) by boiling and on cooling a white crystalline product was obtained in a yield of 11.3 parts by weight. It had a melting point between 86 and 88° C. On recrystallisation from petroleum ether and drying at 1 to 2 millimetres' pressure it had a melting point of 88.3 to 89° C.

The petroleum ether filtrate from the first crystallisation was distilled to remove the solvent and the residual yellow oil fractionally distilled under reduced pressure. Three cuts were recovered, the first boiling between 98 and 104° C./12 mm. and weighing 5.1 parts and a second boiling between 104 and 120° C. under the same pressure and weighing 3.2 parts. These two cuts remained liquid on standing and consisted of the 2:4:4-trimethylchromen. A third fraction boiled between 122 and 144° C. also at 12 mm. and amounted to 3.1 parts by weight. The third fraction crystallised almost entirely. A further 2.9 parts solid remained in the kettle and the condenser. There was thus obtained with the previously recovered 11.3 parts a total of about 17.3 parts by weight of the solid product, which consisted of 2:4:4-trimethylchroman-2-ol, and 8.3 parts by weight of the liquid product which consisted of 2:4:4-trimethylchromen, contaminated with small amounts of 1:3:3-trimethylindane, which could be separated by a further fractional distillation.

Example 2

The decomposition of Example 1 was repeated using 60 parts by weight of a hydroperoxide of 92.7% purity. This was dissolved in 100 parts by volume of acetone which was added during 15 minutes to a boiling solution of 500 parts by volume of acetone containing 2.0 parts by volume of concentrated sulphuric acid and boiled for a further 5 minutes. There were obtained 50.5 parts by weight of a product of which about 40 parts by weight were solid and consisted of the chromanol and 10.5 parts by weight were liquid and consisted of the chromen compound.

Example 3

2 parts by weight of fuller's earth (No. 237, marketed by the Fuller's Earth Union Ltd., Redhill, Surrey) were stirred with 60 parts by volume of benzene at the boiling point and to the mixture was added gradually over 20 minutes a solution of 12 parts by weight of hydroperoxide containing 84.5% trimethylindane hydroperoxide in 40 parts by volume of benzene. The mixture was maintained at the boiling point for a further hour and then filtered from the earth. The resulting solution was then extracted with 4% aqueous sodium hydroxide solution in order to remove brown resinous material and then washed with water. The benzene was removed under reduced pressure and the residue distilled under a reduced pressure of 15 mm. The distillate coming over between 95 and 115° C. was collected and amounted to 4.0 parts by weight. The residue in the distilling vessel on cooling became very viscous and was taken up in boiling petroleum ether (B. P. 60–80° C.), filtered from a small amount of insoluble amorphous solid and allowed to cool, when a crystalline product separated. The latter was buff coloured and had M. P. 84 to 88° C. and consisted of slightly impure chromanol compound.

The liquid fractions from the decompositions carried out in Examples 1 to 3 were collected and distilled under reduced pressure using a small Vigreux type column. Those fractions boiling at 12 mm. pressure between 96 and 104° C./12 mm. had a refractive index $n_D^{20}$ 1.5300 to 1.5302 and consisted of 2:4:4-trimethylchromen.

Example 4

60 parts by weight of the hydroperoxide, which was produced and isolated as shown in Example 1, and was about 95% pure, was dissolved in 100 parts by volume of acetone and added slowly to a solution of 0.6 part by weight of concentrated sulphuric acid in 500 parts by volume of acetone, maintaining this mixture at the boiling point under reflux. After a further 35 minutes boiling, the acid was neutralised with magnesia and the solution filtered off and concentrated free of acetone. Half its volume of light petroleum (B. P. 40 to 60° C.) was added to the product, whereupon crystals deposited which consisted of bis-2:4:4-trimethylchroman-2-yl ether and amounted to 19.2 parts by weight, which was contaminated with a small amount of 2:4:4-trimethylchroman-2-ol and the light petroleum mother liquor furnished 23.7 parts by weight of 2:4:4-trimethylchromen, which was isolated by distillation. The solid product after recrystallisation from ethanol, furnished the pure dichromanyl ether with a melting point 152 to 153° C.

Example 5

50 parts by weight of the hydroperoxide (98% pure) dissolved in 200 parts by volume of acetone was added slowly to a boiling solution of 4 parts by volume of a commercial mixed alkenesulphonic acid, which consisted mainly of butanesulphonic acid dissolved in 200 parts by volume of acetone. After boiling under reflux for a further 10 minutes, the acid was neutralised with magnesia and the solution was filtered and concentrated free of solvent. An equal volume of light petroleum (B. P. 40–60° C.) was added to the residue, and on cooling to —40° C. crystals separated. These were removed and lixiviated with 50 parts by volume of ethanol. The residue consisted of bis-2:4:4-trimethylchromanyl ether and amounted to 5 parts by weight. The ethanolic extract on evaporation yielded 14 parts by weight of 2:4:4-trimethylchroman-2-ol. The light petroleum mother-liquors on distillation afforded 24 parts by weight of 2:4:4-trimethylchromen.

Example 6

25 parts by weight of the hydroperoxide (98% pure) dissolved in 50 parts by volume of benzene was added to a boiling solution of 0.25 part by weight of alkanesulphonic acid of the same kind as was used in Example 5, dissolved in 200 parts by volume of benzene. After boiling under reflux for a further half hour the mixture was neutralised and worked up in the same way as in Example 5, and yielded 15 parts by weight of 2:4:4-trimethylchromen-2 and 2.8 parts by weight of bis-trimethylchromanyl ether.

Example 7

50 parts by weight of the hydroperoxide (99% pure) dissolved in 200 parts by volume of benzene was agitated for 4 hours with a mixture of 55 parts by volume of concentrated sulphuric acid and 100 parts by volume of water, the whole being maintained at 60° C. At the end of this time, the hydroperoxide all having been consumed, the upper organic phase was separated, washed with aqueous alkali and with water, dried and distilled. The reaction product contained of 30 parts by weight of trimethylchromen.

Example 8

A solution of 114 parts by weight of the hydroperoxide (81% pure) in 225 parts by volume of acetone was added rapidly to a boiling solution of 2.8 parts by weight of sulphuric acid in 900 parts by volume of acetone. After 10 minutes the acid was neutralised with magnesia, and the filtered reaction mixture was concentrated free of acetone. The residue was distilled with the addition of 1 part by weight of anhydrous oxalic acid and the resulting distillate consisted of 81 parts by weight of 2:4:4-trimethylchromen.

Example 9

38 parts by weight of 1:1:3-trimethylindane-3-hydroperoxide (81% pure) in 50 parts by volume of acetone was added to a boiling solution of 0.15 part by weight of sulphuric acid in 100 parts by volume of acetone. After 35 minutes, when all the hydroperoxide had been decomposed, the reaction product was distilled. After the solvent had come off, the next fraction, B. P. 100–125°/20 mm., consisted of 2:4:4-trimethylchromen in 86% yield on the starting hydroperoxide.

We claim:

1. The process for the manufacture of 2,4,4-trimethylchroman-2-ol and 2,4,4-trimethylchromen which comprises contacting 1,1,3-trimethylindane-3-hydroperoxide with an acidic condensation catalyst at ordinary temperature around 60° C.

2. Process according to claim 1 wherein the decomposition is carried out under substantially anhydrous conditions.

3. Process according to claim 1 wherein the decomposition is carried out with a solution of the hydroperoxide in an inert organic solvent.

4. Process according to claim 3 wherein the solvent is acetone and the catalyst is sulphuric acid.

5. Process according to claim 4 wherein after substantial completion of the decomposition the acetone is removed and the remaining reaction mixture is subjected to fractional distillation in the presence of a dehydrating agent whereby 2:4:4-trimethylchromen is recovered.

6. Process according to claim 5 wherein the dehydrating agent is sulphuric acid.

7. Process according to claim 4 wherein after substantial completion of the decomposition the acid catalyst is neutralised and the acetone removed from the reaction mixture whereupon 2:4:4-trimethylchroman-2-ol crystallises out from the mixture.

References Cited in the file of this patent

UNITED STATES PATENTS

| | | |
|---|---|---|
| 2,605,290 | Robertson et al. | July 29, 1952 |
| 2,663,735 | Filar et al. | Dec. 22, 1953 |
| 2,668,859 | Scriabine | Feb. 9, 1954 |
| 2,671,809 | Fortiun | Mar. 9, 1954 |
| 2,683,751 | Filar | July 13, 1954 |
| 2,727,927 | Vriens | Dec. 20, 1955 |

OTHER REFERENCES

Kock et al.: Berichte, vol. 75, pp. 1051–54 (1942).